C. D. CHENEY.
BEE ESCAPE.
APPLICATION FILED JUNE 3, 1916.

1,208,482. Patented Dec. 12, 1916.

WITNESSES.
J. A. Demponin
A. W. Dorsett

INVENTOR.
Charles D. Cheney.

UNITED STATES PATENT OFFICE.

CHARLES D. CHENEY, OF LYNDHURST, NEW JERSEY.

BEE-ESCAPE.

1,208,482.  Specification of Letters Patent.  Patented Dec. 12, 1916.

Application filed June 3, 1916. Serial No. 101,497.

*To all whom it may concern:*

Be it known that I, CHARLES D. CHENEY, a citizen of the United States, and a resident of Lyndhurst, in the county of Bergen and State of New Jersey, have invented a new and Improved Bee-Escape, of which the following is a full, clear, and exact description.

The invention relates to beehives and its object is to provide a new and improved bee escape, which is very simple and durable in construction, composed of comparatively few parts, not liable to get easily out of order and arranged to provide a free escape of the bees and one which is not liable to become ineffective on account of the deposit of propolis by the bees or by the accumulation of dead bees.

Another object is to provide a large and direct passageway from one place to another thus affording proper ventilation and preventing the bees from being smothered.

In order to produce the desired result use is made of oppositely disposed spaced plates, of which one is provided with a central inlet opening and a baffle between the said plates and having spring tongues extending radially outward from the said inlet opening and being bent toward the other plate, the free ends of the said spring tongues extending a distance from the said other plate to provide a passageway in any direction in the plane of the plates for the bees entering said inlet.

A practical embodiment of the invention is represented in the accompanying drawings forming a part of this specification, in which similar characters of reference indicate corresponding parts in all the views.

Figure 1:
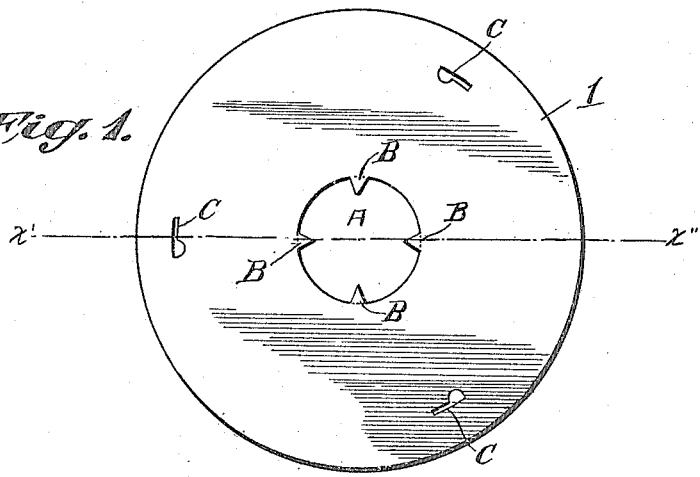
Figure 2:
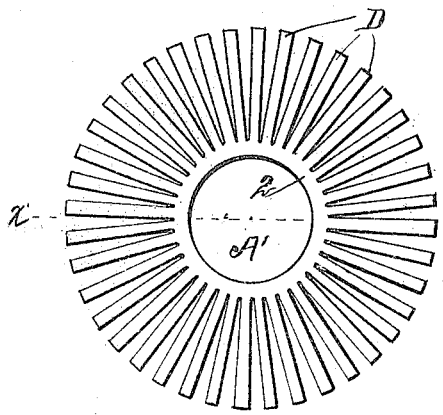
Figure 3:
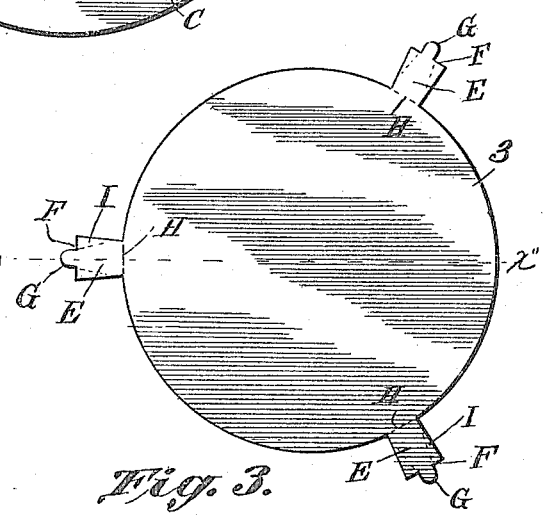
Figure 4:
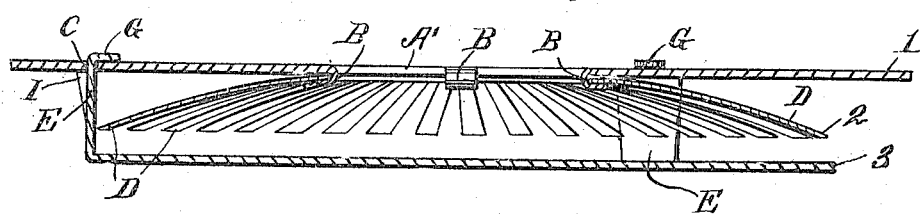

Figure 1 is a plan view of the top plate provided with a central inlet opening; Fig. 2 is a plan view of the baffle; Fig. 3 is a plan view of the bottom plate; and Fig. 4 is an enlarged sectional side elevation of the bee escape on the lines $x'$—$x''$ of Figs. 1, 2 and 3.

The bee escape in its general construction consists of a top plate 1, a baffle 2 attached to the under side of the top plate 1, and a bottom plate 3 spaced a distance from the under side of the top plate 1.

The top plate 1 is provided with a centrally arranged inlet opening A for the entrance of the bees, and from the wall of the central opening A extend short clenching prongs B clenched on the under side of the baffle 2 to securely fasten the latter to the under side of the plate 1. The baffle 2 is in the form of a collar or a ring, the opening A' of which registers with the opening A of the top plate 1, and from the collar extend radially in an outward direction spring tongues or fingers D bent downward toward the bottom plate 3 and terminating at their free ends a distance from the bottom plate 3. The bottom plate 3 is without any opening and forms the floor of the escape. The bottom plate 3 may be attached in various ways to the top plate 1 but I prefer the simple means shown and arranged as follows: The bottom plate 3 is provided at its margin with arms E bent upward (on the dotted lines H) at a right angle to the plate 3. The upper end of each arm E is provided with an angular supporting lug G and with abutting members or shoulders F formed by bending the corners of the arm outwardly along the lines I. The top plate 1 is provided with slots C in register with the arms E and provided with enlarged entrance ends for the passage of the angular lugs G, it being understood that in assembling the parts the lugs G are passed through the enlarged ends of the slots C, and then the bottom plate 3 is slightly turned to move the lugs G out of register with the enlarged ends of the slots C and into engagement with the upper surface of the top plate 1 to support the bottom plate 3 from the top plate 1. It is understood that the angular shoulders F abut against the under side of the top plate 1 to provide a comparatively rigid connection between the arms E and the top plate 1. When it is desired to disassemble the parts a slight turn is given to the bottom plate 3 until the lugs G are in register with the enlarged entrance ends of the slots C to allow of moving the plates 1 and 3 apart.

In practice, the top and bottom plates 1 and 3 are preferably made circular, and the bottom plate 3 is somewhat less in diameter than the top plate 1. By the arrangement described the bees can readily enter through the registering openings A and A' and then travel along the plate or floor 3 in any direction and finally pass under the prongs D at the free ends thereof, it being understood that as these prongs are made of spring metal they readily yield on an upward pressure by bees passing under them, thus allowing the bees to pass out. A prong immediately returns to its normal position after a bee has passed. It will be noticed that by the arrangement described the free ends of the prongs prevent return movement of any bees as the bees cannot lift the prongs from the outside to pass under the prongs.

In using the bee escape, it is inserted into a suitable opening in the usual escape board and this escape board is then placed under the super which is to be cleared of bees and over the brood chamber into which the bees will return through the escape, care being taken to place the escape the proper side up, as shown in Fig. 4.

It is expressly understood that by the use of my bee escape a passageway is had in every direction for an entering bee, thus expediting the escape of the bees and thereby shortening the time required to clear the super.

Having thus described my invention, I claim as new and desire to secure by Letters Patent:

1. A bee escape, comprising oppositely disposed spaced plates, of which one is provided with a central inlet opening, and a baffle between the said plates and having spring tongues extending radially outward from the said inlet opening and being bent toward the other plate, the free ends of the said tongues extending a distance from the said other plate to provide a passage in any direction in the plane of the plates for the bees entering the said inlet.

2. A bee escape, comprising a top plate having a central opening, a bottom plate arranged parallel to the said top plate, and a baffle attached to the under side of the said top plate and having an opening in register with the said central opening of the top plate, and spring tongues extending radially outward and bent toward the said bottom plate, the free ends of the spring tongues terminating a distance from the said bottom plate to provide a passage in every direction in the plane of the plates for the bees entering the said central opening.

3. A bee escape, comprising a top plate having a central inlet opening, a bottom plate, attaching members detachably connecting the said plates with each other and holding the said plates spaced apart, and a baffle attached to the under side of the said top plate and having an opening in register with the central opening and having spring tongues extending radially outward and bent toward the other plate, the free ends of the tongues terminating a distance from the said other plate to provide a passage for the bees entering the said inlet opening.

4. A bee escape, comprising a circular top plate having a central inlet opening and marginal slots, a circular bottom plate of a diameter less than that of the said top plate, the said bottom plate being provided with struck-up arms engaging the said slots to fasten the plates together and to hold the plates spaced apart, and a baffle in the form of a collar having radially disposed and outwardly extending spring tongues, the said top plate having clenching members at the central opening and engaging the said collar to attach the latter to the under side of the top plate, the said spring tongues terminating at their free ends a distance from the said bottom plate and at points within the marginal edge thereof.

All of which is hereby authenticated by my signature affixed in the presence of these witnesses.

CHARLES D. CHENEY.

Witnesses:
AARON F. NICHOLS,
PAUL A. CALZETTI.